United States Patent [19]

Roof et al.

[11] Patent Number: 5,101,540

[45] Date of Patent: Apr. 7, 1992

[54] LAMP HOUSING MOUNTING CLIP

[75] Inventors: James A. Roof, Bloomfield; Kenneth J. Foley, Sterling Heights, both of Mich.

[73] Assignee: General Motors Corporation, Detroit, Mich.

[21] Appl. No.: 740,239

[22] Filed: Aug. 5, 1991

[51] Int. Cl.$^5$ .............................................. A44B 21/00
[52] U.S. Cl. ........................................ 24/458; 24/293; 24/295
[58] Field of Search .................. 24/458, 293, 295, 297

[56] References Cited

U.S. PATENT DOCUMENTS

| | | | |
|---|---|---|---|
| 2,184,255 | 12/1939 | Kral | 24/293 |
| 2,200,047 | 5/1940 | Tinnerman | 24/458 |
| 2,566,886 | 9/1951 | Hartman | 24/458 |
| 2,658,247 | 11/1953 | Heuer | 24/458 |
| 2,825,948 | 3/1958 | Parkin | 24/458 |
| 3,508,371 | 4/1970 | Meyer | 24/295 |
| 4,011,635 | 3/1977 | Meyer | 24/293 |

*Primary Examiner*—Victor N. Sakran
*Attorney, Agent, or Firm*—Edward J. Biskup

[57] ABSTRACT

A mounting clip for securing a lamp housing to a support panel formed with a retainer slot having an access portion and a retainer portion, and in which the mounting clip has a hold-down portion adapted to be fixedly connected to the lamp housing and be inserted into the access portion of the retainer slot after which a movement of the lamp housing towards the retainer portion of the retainer slot causes a lock portion of the mounting clip to engage teeth provided in the retainer portion to lock the lamp housing to the support panel.

6 Claims, 3 Drawing Sheets

LAMP HOUSING MOUNTING CLIP

This invention concerns lamp housings and more particularly pertains to a mounting clip for fastening a lamp housing to a support panel.

Lamp housings, such as used in automobiles for the center high mounted stop lights (CHMSL), are normally secured to the support panel adjacent the backlite by a plurality of threaded fasteners. In order to simplify and expedite the mounting of the CHMSL to the support panel during the manufacture of the automobile, we propose having the fastener portion made as a clip which is attached to the lamp housing and have such clip cooperate with suitable slot means formed in the support panel so that mounting of the housing can be facilitated without the need for threaded or other similar forms of fastening means.

To this end, the present invention concerns a mounting clip for connecting a lamp housing to a support panel having an elongated slot formed therein provided with an access portion and a retainer portion. The access portion is of greater width than the retainer portion and the latter is formed with a plurality of ratchet teeth. More specifically, the mounting clip comprises an elongated body one end to which is formed with a hold-down portion and the other end of which is formed with a lock portion. The hold-down portion includes a reversely bent spring arm adapted to be clipped onto a part of the lamp housing and cooperating means on the spring arm and the lamp housing serve to secure the spring arm to the lamp housing when the spring arm is clipped to the lamp housing. In addition, a pair of laterally outwardly extending feet are located below the spring arm, and the lock portion has a downwardly extending tongue member. The arrangement is such that when the spring arm is secured to the lamp housing and the pair of feet of the hold-down portion of the mounting clip are inserted into the access portion of the slot in the support panel, movement of the lamp housing towards the retainer portion of the slot causes the tongue member to engage the ratchet teeth and the feet to contact the underside of the support panel to lock the lamp housing to the support panel.

The objects of the present invention are to provide a new and improved mounting arrangement for a lamp housing that permits the latter to be quickly fastened to a support panel without the use of any tools and is characterized in that the fastening means takes the form of a mounting clip which is secured to the lamp housing and has portions which cooperate with a slot in the support panel for locking the lamp housing thereto; to provide a new and improved mounting clip for a vehicle lamp housing which includes a hold-down portion at one end and a lock portion at the other end and cooperates with a slot formed in a support panel that is provided with ratchet teeth for locking the lamp housing to the support panel; to provide a new and improved mounting clip for fastening a lamp housing to a support panel that is formed with a retainer slot having an access portion and a retainer portion and in which the mounting clip has a hold-down portion adapted to be connected to the lamp housing and be inserted into the access portion of the slot after which movement of the lamp housing towards the retainer portion of the retainer slot causes a lock portion of the mounting clip to engage teeth provided in the retainer portion of the slot to lock the lamp housing to the support panel; and to provide a new and improved mounting clip for fastening a lamp housing to a planar support panel of a motor vehicle that is characterized in that the mounting clip has a hold-down portion at one end that includes a reversely bent spring arm and a pair of laterally outwardly extending feet while the other end of the mounting clip is formed with a lock portion having a downwardly projecting tongue and wherein the hold-down portion together with the lock portion are adapted to cooperate with the lamp housing and a retainer slot formed in the support panel for releasably maintaining the housing in a fixed position on the support panel.

Other objects and advantages of the present invention will be apparent from the following detailed description when taken with the drawings in which.

Figure 5:
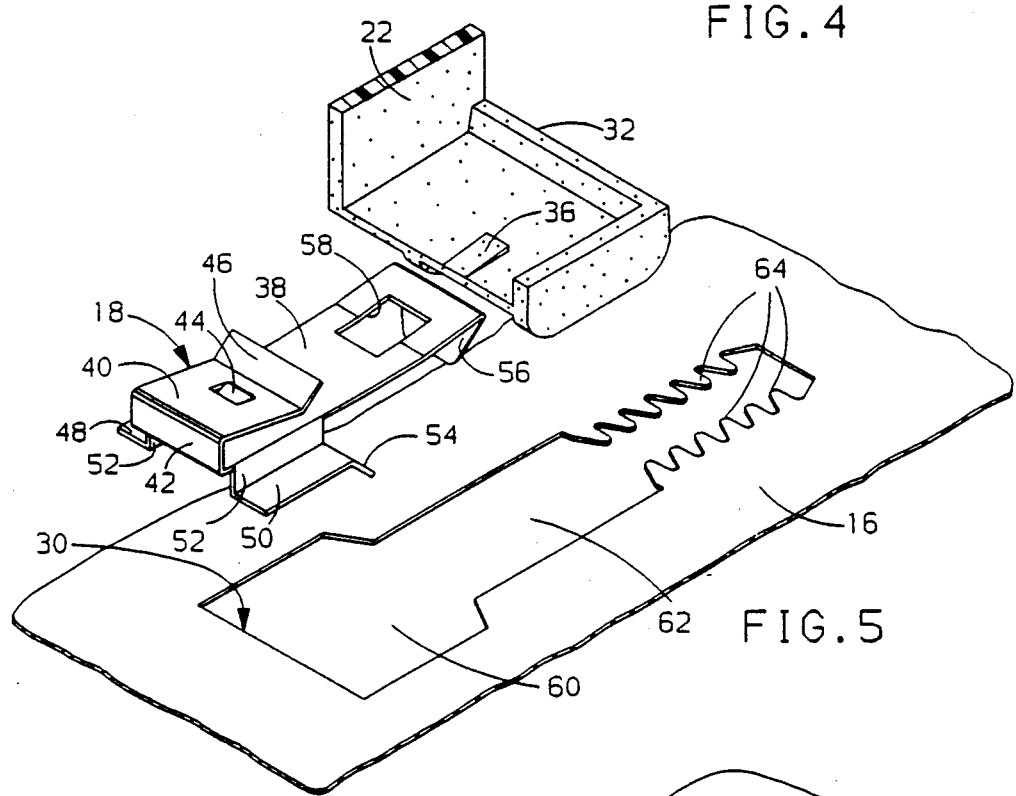
Figure 6:
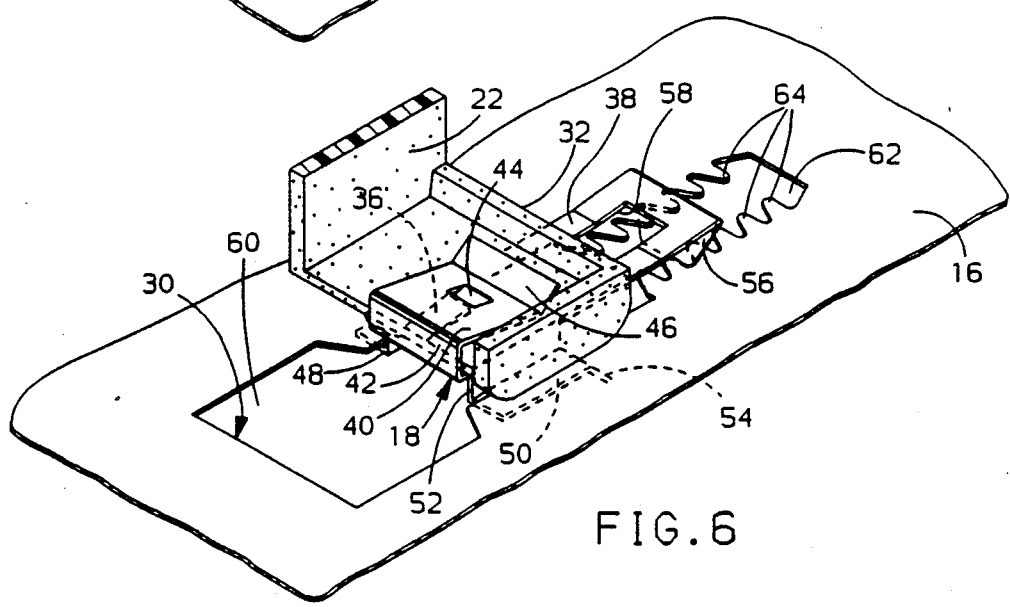

FIG. 5 is an isometric view of the mounting clip, a flange part of the lamp housing, and the retainer slot in the support panel prior to assembly of the mounting clip to the lamp housing and fastening with the slot; and FIG. 6 is an isometric view showing the mounting clip secured to the flange part of the lamp housing and the mounting clip located in the retainer slot in the support panel for fastening of the lamp housing to the support panel.

Figure 1:
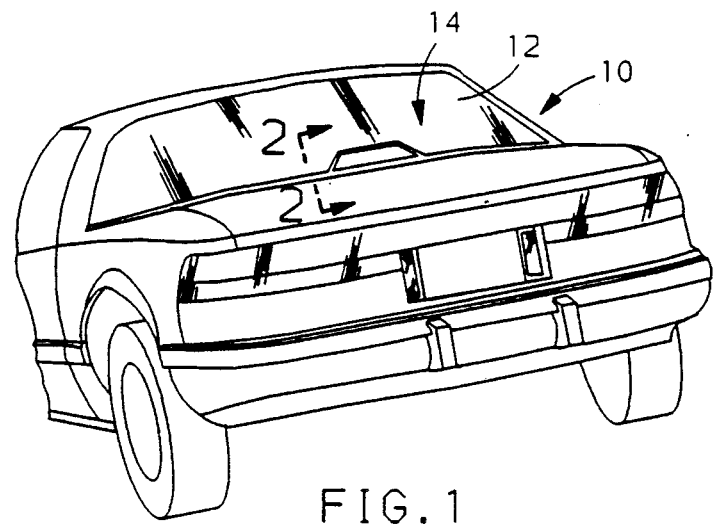
FIG. 1 is a perspective view of the rear end of a motor vehicle incorporating a mounting clip in accordance with the present invention for fastening a lamp housing to a support panel.
Figure 2:
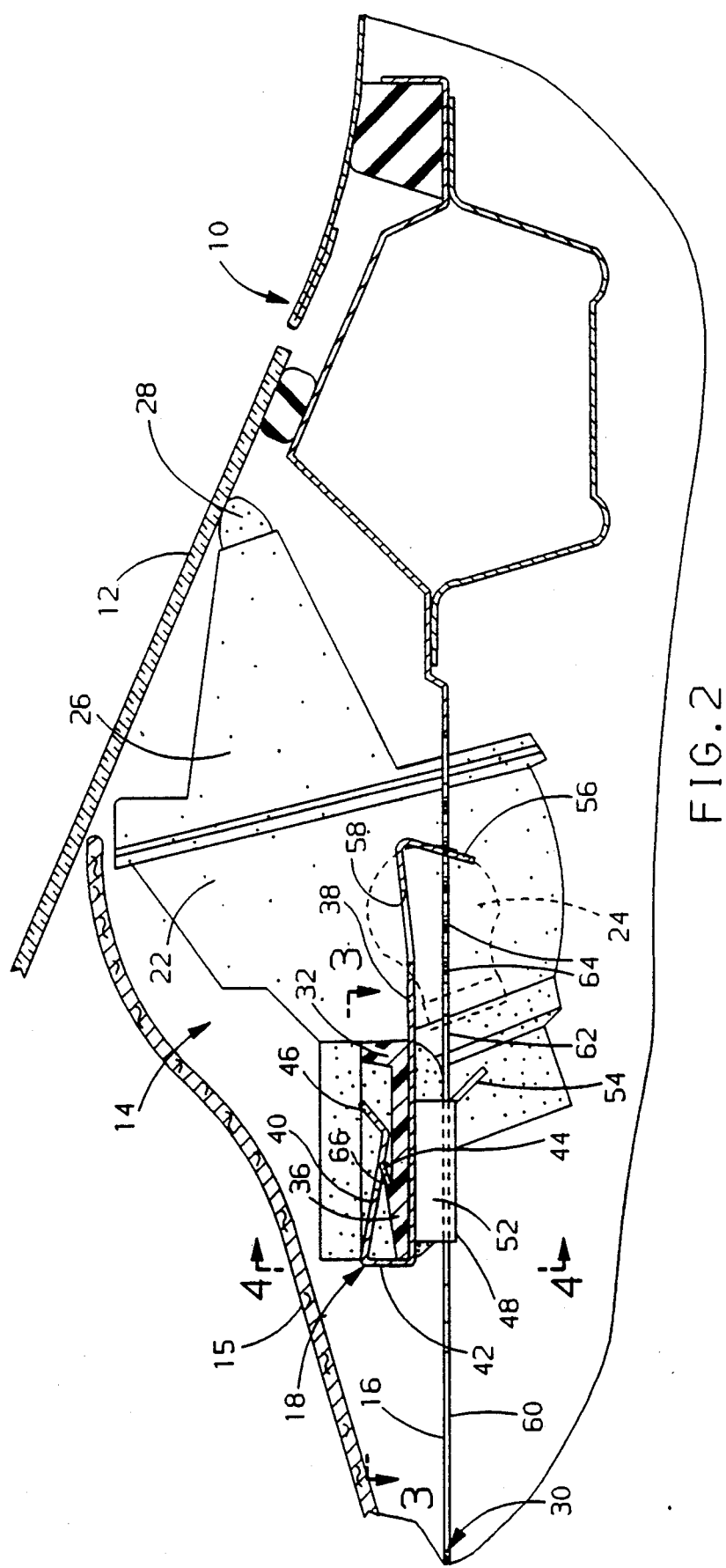
FIG. 2 is an enlarged elevational view of the mounting clip taken on line 2—2 of FIG. 1 and shows the mounting clip connected to the lamp housing and cooperating with a slot formed in the support panel for maintaining the lamp housing in a fixed position.

Referring now to the drawings and more particularly FIGS. 1 and 2 thereof, the rear end of a motor vehicle 10 is shown having the usual rear window or backlite 12 behind which is provided a center high mounted stop light 14 a portion of which is concealed by a removable cover 15. As best seen in FIG. 2, the stop light 14 is secured to a sheet metal support panel 16 by a pair of identical mounting clips 18 and 20 each of which is made in accordance with the present invention and can more clearly be seen in FIG. 3.

Figure 3:
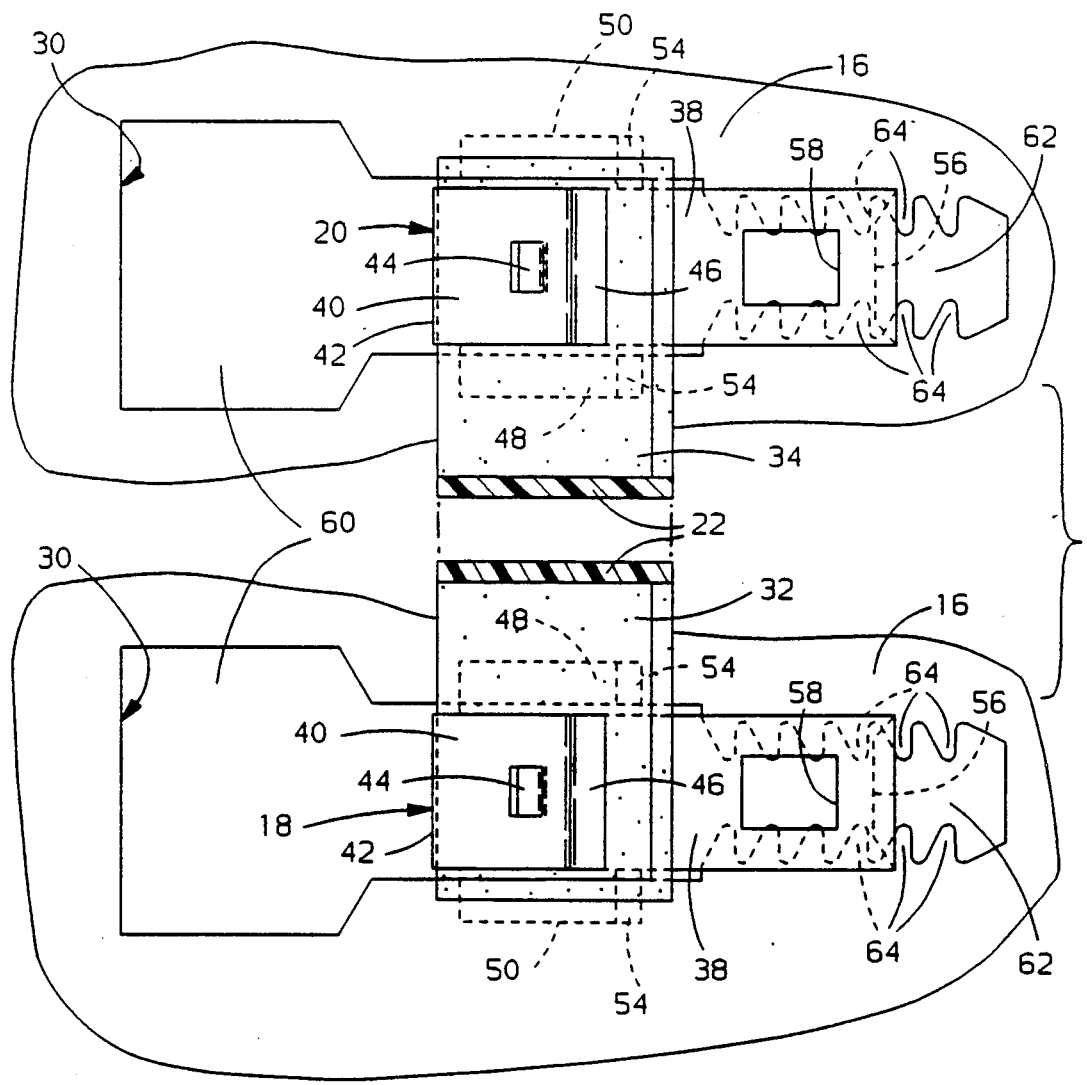
FIG. 3 is a plan view taken on line 3—3 of FIG. 2 but with the lamp housing removed and shows the shape of the retainer slots in the support panel with which a pair of the mounting clips cooperate for securing the lamp housing in position.

More specifically, as seen in FIG. 2, the stop light 14 includes a lamp housing or reflector member 22 made of a plastic material and provided with a light bulb 24. The front open end of the lamp housing 22 is closed by a lens member 26 which terminates with a bumper member 28 adapted to abut the inner lower surface of the backlite 12 when the stop light 14 is in the operative position. The lamp housing 22 is maintained in the disclosed abutting position relative to the back lite 12 by the pair of mounting clips 18 and 20 each of which is identical in size and configuration and, in the preferred form, cooperates with a retainer slot 30 formed in the support panel 16 for securing the lamp housing 22 thereto. In the case of the stop light 14 shown in FIG. 2, the mounting clips 18 and 20 are connected to laterally spaced outwardly extending flanges 32 and 34 which are mirror images of each other and are integrally formed with the opposed sides of lamp housing 22 as seen in FIG. 3. As seen in FIGS. 2 and 5, each flange 32-34 is molded with an raised ramp member 36, which as hereinafter will be explained, serves to positively connect the lamp housing 22 to the associated mounting clip.

As best seen in FIG. 3, each of the mounting clips 18-20 cooperates with the associated retainer slot 30 formed in the support panel 16 for securing the lamp housing 22 in the position shown in FIG. 2. It will be understood, however, that rather than having a pair of mounting clips 18-20 on opposed sides of the lamp housing as shown in FIG. 3, a single mounting clip could be used for securing the lamp housing 22 to the support panel 16 by placing the flange centrally behind the lamp housing and securing the mounting clip according to the present invention thereto.

Figure 4:
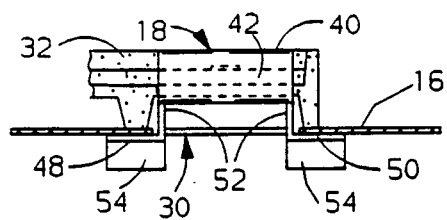
FIG. 4 is an view of the mounting clip taken on line 4—4 of FIG. 2.

As seen in FIGS. 2, 3, and 4, each mounting clip 18 and 20 is made from a material such as sheet metal and includes an elongated body portion 38 formed with a hold-down portion at one end and a lock portion at the other end. The hold-down portion of each mounting clip 18-20 has a reversely bent spring arm 40 that is integrally connected to the body portion 38 by an upstanding end wall 42. As seen in FIG. 2, the spring arm 40 normally extends downwardly towards the body portion 38 of the mounting clip and is formed with a tang 44 which also extends downwardly towards the body portion but in a direction opposite to the direction of the spring arm 40. The free end of the spring arm 40 is integrally formed with a generally upwardly extending glide member 46 while, just below the spring arm 40, the opposite side edges of the body portion 38 are integrally formed with a pair of laterally spaced and horizontally outwardly extending feet 48 and 50. Each foot 48 and 50 is connected to the associated side edge of the body portion 38 by a vertically orientated side wall 52 and each foot 48-50 an end portion thereof integrally formed with glide member 54 similar to the glide member 46 provided on the spring arm 40.

As best seen in FIG. 2, the lock portion of each mounting clip 18-20 consists of a downwardly extending tongue 56 which is integrally formed with the body portion 38 and is slightly inclined towards the glide members 54 formed with the feet 48-50 of the hold-down portion of the associated mounting clip. A generally rectangular opening 58 is centrally formed in the body portion 38 between the side edges thereof and is located adjacent the tongue 56.

As seen in FIGS. 3, 4, and 5, each of the retainer slots 30 comprises an access portion 60 and a retainer portion 62 aligned along a common longitudinal axis. The access portion consists of a generally rectangular opening having a length dimension slightly greater than the longitudinal length of each foot 48-50 including the glide member 54 and a width dimension slightly greater than the transverse distance between outer edges of the feet 48 and 50. The retainer portion of each retainer slot 30 has a width dimension slightly greater than the width dimension of the body portion 38 and has one end provided a plurality of inwardly extending ratchet teeth 64 located along each side of the side edges of the retainer portion 62.

When the present stop light 14 is to be secured to the support panel 16, initially the mounting clip 18 and 20 are secured to the flanges 32 and 34 of the lamp housing 22. In this regard and as seen in FIG. 5, the hold-down portion of the mounting clip 18 is first aligned with the ramp member 36 of the associated flange 32 and moved towards the flange 32 with the glide member 46 contacting the top of the ramp member 36 so that the space between the spring arm 40 and the body portion 38 of the hold-down portion receives the flange 32. As the mounting clip 18 is moved to the position seen in FIG. 2, the tang 44 engages the shoulder 66 of the ramp member 36 to secure the mounting clip 18 to the flange 32. The spring arm 40 provides a continuous biasing force towards the flange 32 so that the tang 44 maintains its position and causes the flange 32 to be firmly gripped with a squeezing action provided by the spring arm 40 acting with the body portion 38 of the mounting clip 18.

As should be apparent, when the pair of mounting clips 18 and 20 have been secured to the stop light 14 (as is the case with the present invention) the lamp housing 22 is in a condition to be releasably fastened to the support panel 16. In this regard, it will be understood that the cover 15 will not be present and the pair of retainer slots 30 will be spaced from each other a distance which will allow the pair of hold-down portions of the mounting clips 18 and 20 to be inserted into the access portions of the two retainer slots 30. Accordingly, once the mounting clips 18 and 20 are attached to the lamp housing 22 as explained above, the hold-down portion of each mounting clip 18 and 20 is vertically aligned with the access portion of the associated retainer slot 30. The feet 48 and 50 of each hold-down portion is then inserted into the access portion of the retainer slot 30 after which the lamp housing is moved towards the retainer portion of the retainer slot 30. As the lamp housing 22 moves in this direction, it moves towards the backlite 12 and the glide members 54 initially make contact with underside of the support panel 16 followed by the top surface of the feet 48-50 making contact with the underside or lower surface of the support panel 16 while at the same time the tongue 56 starts to engage the ratchet teeth 64. Movement towards the backlite 12 is permitted until the bumper 28 contacts the backlite 12 whereupon the tongue 56 engages a pair of teeth 64 as seen in FIGS. 2 and 3 and the stop light 14 assumes the position seen therein. In this position, the stop light 14 is secured to the support panel 16 and by reason of having one pair of the ratchet teeth in engagement with the tongue 56 as seen in FIG. 3 and the feet 48 and 50 engaging the underside of the support panel 16 as seen in FIG. 4, the stop light 14 maintains the fixed position seen in FIG. 2 relative to the support panel 16. If for some reason it is desired to remove the stop light 14 from the support panel 16, this can be easily done by merely inserting a tool, such as a screw driver, into the opening 58 formed in the body portion 38 of each mounting clip and moving it upwardly to release the tongue 56 from engagement with the aforementioned ratchet teeth 64 and simultaneously moving the stop light 14 away from the backlite 12 until the feet 48 and 50 of the hold-down portion are located in the access portion of slot 30 whereupon the lamp housing 22 can be raised and removed from the support panel.

Various changes and modifications can be made in the construction of this mounting arrangement without departing from the spirit of the invention. Such changes and modifications are contemplated by the inventors and they do not wish to be limited except by the scope of the appended claims.

The embodiments of the invention in which an exclusive property or privilege is claimed are defined as follows:

1. A mounting clip for connecting a lamp housing to a support panel having an elongated retainer slot formed therein provided with an access portion and a retainer portion, said access portion being of greater width than the retainer portion and the latter having a plurality of ratchet teeth formed therein, said mounting clip comprising a body portion formed with a hold-down portion and a lock portion, said hold-down portion including a reversely bent spring arm adapted to be clipped onto a part of the lamp housing, a pair of laterally outwardly extending feet supported by said body portion, and said lock portion having a downwardly extending tongue, the arrangement being such that when the spring arm is secured to the lamp housing and the pair of feet of the mounting clip is inserted into the access portion of the slot in the support panel, movement of the lamp housing towards the retainer portion of the slot causes the tongue to engage the ratchet teeth and the feet to engage the underside of the support panel to lock the lamp housing to the support panel.

2. A mounting clip for connecting a lamp housing to a support panel having an elongated retainer slot formed therein provided with an access portion and a retainer portion, said access portion being of greater width than the retainer portion and the latter having a plurality of ratchet teeth formed therein, said mounting clip comprising an elongated body portion one end to which is formed with a hold-down portion and the other end of which is formed with a lock portion, said hold-down portion including a reversely bent spring arm adapted to be clipped onto a part of the lamp housing, cooperating parts on said spring arm and said lamp housing for releasably connecting said spring arm to said lamp housing when the spring arm is clipped onto said part of the lamp housing, a pair of laterally outwardly extending feet located adjacent the spring arm, and said lock portion having a downwardly extending tongue, the arrangement being such that when the spring arm is secured to the lamp housing and the pair of feet of the hold-down portion of the mounting clip is inserted into the access portion of the slot in the support panel, movement of the lamp housing towards the retainer portion of the slot causes the tongue to engage the ratchet teeth and the feet to engage the underside of the support panel to lock the lamp housing to the support panel.

3. A mounting clip for connecting the flange of a lamp housing to a support panel having an elongated retainer slot formed therein provided with an access portion and a retainer portion, said access portion being of greater width than the retainer portion and the latter having a plurality of ratchet teeth formed therein, said mounting clip comprising a elongated body portion one end to which is formed with a hold-down portion and the other end of which is formed with a lock portion, said hold-down portion including a reversely bent spring arm adapted to be clipped onto a part of the flange of the lamp housing, detent means forming a part of said spring arm and said lamp housing for releasably locking said spring arm to said lamp housing when the spring arm is clipped onto said flange of the lamp housing, a pair of laterally outwardly extending feet located adjacent the spring arm, and said lock portion having a downwardly extending tongue, the arrangement being such that when the spring arm is secured to the lamp housing and the pair of feet of the hold-down portion of the mounting clip is inserted into the access portion of the retainer slot in the support panel, movement of the lamp housing towards the retainer portion of the retainer slot causes the tongue to engage the ratchet teeth and the feet to engage the underside of the support panel to lock the lamp housing to the support panel.

4. The mounting clip of claim 3 wherein said detent means including a tang extending from the spring arm and a ramp member formed on the flange of said lamp housing.

5. The mounting clip of claim 3 wherein said lock portion includes an opening accomodating a tool for releasing said tongue from engagement with the ratchet teeth.

6. The mounting clip of claim 3 wherein said spring arm is provided with a glide member for facilitating the joining of the mounting clip to said flange.

* * * * *